(12) United States Patent
Arango et al.

(10) Patent No.: US 7,969,974 B2
(45) Date of Patent: Jun. 28, 2011

(54) SYSTEM AND METHOD FOR PROVIDING A MULTIPATH SWITCHOVER BETWEEN REDUNDANT STREAMS

(75) Inventors: Jesus M. Arango, San Ramon, CA (US); Daniel A. Alvarez, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 114 days.

(21) Appl. No.: 12/251,604

(22) Filed: Oct. 15, 2008

(65) Prior Publication Data

US 2010/0091645 A1    Apr. 15, 2010

(51) Int. Cl.
H04L 12/28    (2006.01)
(52) U.S. Cl. ....................................................... 370/389
(58) Field of Classification Search .................. 370/389; 386/68; 709/231
See application file for complete search history.

(56) References Cited

U.S. PATENT DOCUMENTS

| | | |
|---|---|---|
| 6,910,148 B1 | 6/2005 | Ho et al. |
| 6,912,197 B2 | 6/2005 | Mahamuni |
| 7,092,354 B2 | 8/2006 | Jensen |
| 7,155,632 B2 | 12/2006 | Vasavada |
| 7,209,435 B1 | 4/2007 | Kuo et al. |
| 7,230,872 B2 | 6/2007 | Winograd et al. |
| 7,248,560 B1 | 7/2007 | Blankenship et al. |
| 7,269,132 B1 | 9/2007 | Casey et al. |
| 7,392,424 B2 | 6/2008 | Ho et al. |
| 7,394,776 B2 | 7/2008 | Lee et al. |
| 2009/0067323 A1* | 3/2009 | Matsushima et al. ......... 370/225 |
| 2009/0147787 A1* | 6/2009 | Arulambalam et al. ...... 370/392 |

* cited by examiner

*Primary Examiner* — Ricky Ngo
*Assistant Examiner* — Chandrahas Patel
(74) *Attorney, Agent, or Firm* — Patent Capital Group

(57) ABSTRACT

A method is provided in one example embodiment and it includes receiving a first plurality of packets from an active stream at an output device and communicating the first plurality of packets to a next destination. The method also includes receiving a second plurality of packets from a standby stream of the output device, the streams are sent by an input device. The method further includes performing a switchover at the output device such that the second plurality of packets is communicated to the next destination and the first plurality of packets is not. The switchover is triggered when a portion of the first plurality of the packets from the active stream is not received during a period of time that is greater than a majority of inter-arrival times of the second plurality of packets on the standby stream.

17 Claims, 2 Drawing Sheets

SYSTEM AND METHOD FOR PROVIDING A MULTIPATH SWITCHOVER BETWEEN REDUNDANT STREAMS

TECHNICAL FIELD OF THE INVENTION

This invention relates in general to the field of communications and, more particularly, to a system and a method for providing a multipath switchover between redundant streams.

BACKGROUND OF THE INVENTION

Networking architectures have grown increasingly complex in communication environments. This complexity has resulted in numerous protocols being implemented to ensure that network elements are directing packets in an efficient manner. For example, certain network elements may offer redundancy to an architecture: ensuring that there is a consistent and accurate routing of information to an output device. Consider two redundant datagram streams that reach an edge node through different paths. The edge node typically forwards a single stream to its clients. At all times there will be one stream that is active and one stream operating as a standby.

A local or a remote failure may disrupt the flow of packets on the active stream. Any flow irregularities in the active stream should be detected as quickly as possible in order to perform a switchover to the standby stream in a timely manner. Slow responses to flow irregularities can disrupt service to clients. Unnecessary switchovers may introduce packet gaps and retransmissions on the resulting stream that is presented to the clients.

Thus, the ability to offer a system or a protocol that offers an effective redundancy system for network elements (without hindering system speeds, creating unnecessary overhead, or taxing processing capabilities of network components) provides a significant challenge to network designers, component manufacturers, service providers, and system administrators alike.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and it includes receiving a first plurality of packets from an active stream at an output device and communicating the first plurality of packets to a next destination. The method also includes receiving a second plurality of packets from a standby stream at the output device. The streams are sent by an input device. The method further includes performing a switchover at the output device such that the second plurality of packets is communicated to the next destination and the first plurality of packets is not. The switchover is triggered when a portion of the first plurality of the packets from the active stream is not received during a period of time that is greater than a majority of inter-arrival times of the second plurality of packets on the standby stream.

In more specific embodiments, the switchover is performed after waiting for a period of inactivity on the active stream that is greater than an estimated maximum inter-arrival time (EMIT) of the second plurality of the packets of the standby stream. The EMIT can be computed by observing inter-arrival times of the second plurality of packets on the standby stream. Furthermore, the EMIT can be computed by observing an average inter time (AIT) and adding that to a standard inter-arrival deviation (SID), which is multiplied by a constant. In yet other embodiments, the constant can be determined by maintaining a history over a moving time window. The history represents whether a particular inter-arrival observation is below the EMIT, the history being used to compute a percentage of conforming observations. The EMIT being computed to maintain a certain level or percentage of conforming observations. In yet other embodiments, the window may be a moving sample window where it moves to contain the latest fixed-size set of inter-arrival observations.

Figure 1:
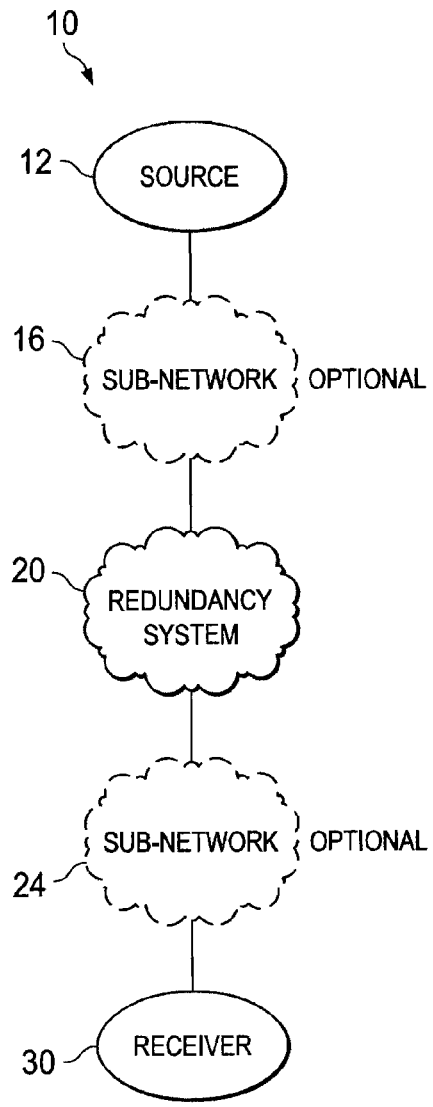
FIG. 1 is a simplified block diagram of a communication system for providing redundancy in a network environment in accordance with one embodiment of the present invention.

FIG. 1 is a simplified block diagram of a communication system 10 for providing redundancy in a network environment. Communication system 10 may include a source 12, which is a host that can be connected to a redundancy system 20 directly or indirectly through a sub-network 16. Redundancy system 20 can be connected to another optional sub-network 24, which could be connected to a receiver 30. If all the optional sub-networks were eliminated, then the flow would be source, system, and receiver. Note that the present invention operates such that redundancy system 20 is indifferent to whether there are sub-networks present in the architecture, meaning: the presence of sub-networks is somewhat transparent to redundancy system 20. From a logical perspective, redundancy system 20 understands that it has a generic input above it and an output below it.

FIG. 1 may be generally configured or arranged to represent any communication architecture capable of exchanging packets in a network environment. Such configurations may include, for example, first generation, 2G, 2.5G, and 3G architectures that offer packet-exchanging capabilities. In addition, communication system 10 may include any suitable networking protocol or arrangement that provides a communicative platform for communication system 10. Thus, communication system 10 may include a configuration capable of transmission control protocol/internet protocol (TCP/IP) communications for the transmission or reception of packets in a network. Communication system 10 may also operate in conjunction with a user datagram protocol/IP (UDP/IP) or any other suitable protocol where appropriate and based on particular needs.

Figure 2:
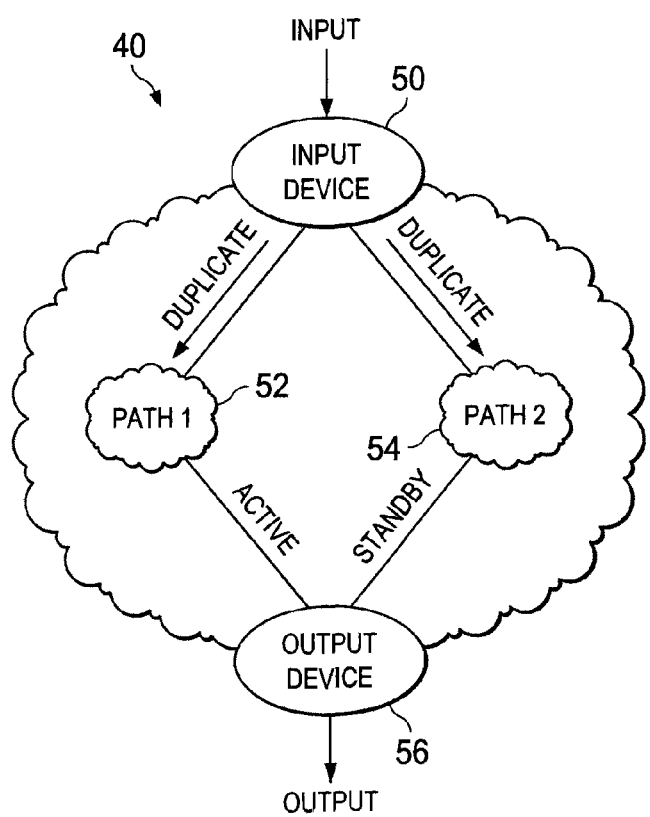
FIG. 2 is a simplified block diagram of an input device and an output device that enables redundancy in a network environment in accordance with one embodiment of the present invention.

Turning now to FIG. 2 (such that it can be discussed in conjunction with FIG. 1), FIG. 2 illustrates an example block diagram that depicts an input and output flow 40. In FIG. 2, there is provided an input device 50 and an output device 56, which are connected via two paths 52 and 54. The paths between these devices are explained in detail below. In one example, input device 50 and output device 56 are routers, which can include appropriate software to execute the described operations in an example embodiment of the present invention. As used herein in this Specification, the terms 'input device' and 'output device' are meant to encompass routers, switches, gateways, bridges, loadbalancers, firewalls, or any other suitable device, component, element, or object operable to exchange information in a network environment. In one example implementation, output device 56 includes software to achieve the optimal redundancy operations as outlined herein in this document.

In other embodiments, this feature may be provided external to output device 56 or included in some other network device to achieve this intended functionality. Alternatively, both input device 50 and output device 56 include this software. In still other embodiments, one or both of these devices may include any suitable algorithms, hardware, software, components, modules, interfaces, or objects that facilitate the operations thereof. This may be inclusive of appropriate communication protocols that allow for the effective exchange of data or information for achieving redundancy.

Each of input device 50 and output device 56 can also include memory elements for storing information to be used in achieving the redundancy operations as outlined herein. Additionally, each of these devices may include a processor that can execute software or an algorithm to perform the redundancy activities as discussed in this specification. These devices may further keep information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

Input device 50 has two outgoing links, which transmit replicated inputs (as depicted) that are received by input device 50. For example, if input device 50 were to receive packet #1, it would copy that packet and send it along the links toward path 1 and path 2.

The two outgoing links follow along to output device 56, which is the functional output of the redundancy system. Output device 56 can receive two streams over two different links (one active and one standby) and then decide which of the packets it should communicate (forward/send) to a subnetwork or to a receiver below it. Thus, output device 56 is systematically receiving packets from two different interfaces and making routing decisions.

In some systems, output device 56 simply makes an arbitrary decision as to which input interface to select in making forwarding decisions. Once it chooses an interface, it maintains that communication with the interface until something goes wrong with that chosen interface. If there is an issue with that interface, output device 56 can readily switch to another interface. The point in such a protocol is that this switching between interfaces occurs seldom.

In accordance with the techniques and teachings of the present invention, communication system 10 provides a communication approach that offers an adaptive mechanism, which addresses the problem of deciding when to switch between two redundant streams at the edge of a multipath delivery system. The proposed mechanism performs a switchover if the period of inactivity on the active stream is greater than the estimated maximum inter-arrival time on the standby stream. This time is adaptively computed to conform with users expectations.

For purposes of illustrating the techniques of communication system 10, it is important to understand the somewhat esoteric communications that may be traversing the network at any given moment. The following foundational information may be viewed as a basis from which the present invention may be properly explained. Such information is offered earnestly for purposes of explanation only and, accordingly, should not be construed in any way to limit the broad scope of the present invention and its potential applications.

There are different types of failures that can disrupt a packet flow. For example, the failure could be local or it could be remote. As used herein in this Specification, the term 'event' is meant to encompass any type of failure, disruption, error, or irregularity in the transmission of packets. A previously known solution to address these failures is to perform a switchover if no datagram has been received on the active stream after a fixed amount of time. Another known solution is to simply take each datagram from the stream on which it first arrives. These solutions have the undesirable characteristic of assuming knowledge about the timing properties of the application or the contents of the datagrams.

Consider two redundant datagram streams that reach an edge node through different paths. The edge node generally forwards only one stream to its clients. Commonly, there will be one stream that is active and another that operates as a standby. The active stream is the one being forwarded to the clients or to the receiver end, as shown in FIGS. 1 and 2.

A local or remote failure may disrupt the flow of packets on the active stream. Flow irregularities in the active stream should ideally be detected as quickly as possible in order to perform a switchover to the standby stream in a timely manner. A good switchover mechanism detects irregularities, while minimizing unnecessary switchovers. A slow response to flow irregularities can disrupt the service to the client. Unnecessary switchovers may introduce packet gaps and retransmissions on the resulting stream that is presented to the clients.

Communication system 10 provides an adaptive, intelligent mechanism, where switchovers are performed if no datagram (i.e., packet) has been received on the active stream for a period of time that is greater than vast majority of inter-arrival times observed on the standby stream. The reasoning behind this mechanism is that, although there will be short-term differences between flows, inter-arrival time distributions are expected to be similar. During steady state, an inter-arrival time that is highly unlikely in the standby stream is also highly unlikely for the active stream. Consequently, if the period of inactivity on the active stream is greater than the vast majority of observations on the standby stream, then there is a high probability of a flow disruption on the active stream.

Note that there are no assumptions being made about the timing properties or message formats of the streams. The switchover mechanism is able to adapt to the properties of the streams and to changing conditions in the network. The selections outlined herein can be related to redundancy and high availability architectures. Further, video and audio broadcast services could benefit from such technology. Quality of service protocols could also readily benefit from such redundancy improvements. Multi-topology routing can be used to implement the multipath configuration. Moreover, any service providers could benefit from this technology for content distribution operations. Real-time transport protocol (RTP) could be a likely container for many of the these redundant streams. The switchover mechanism outlined herein could also be useful in multicast live-live technology.

Example embodiments of the present invention can improve the performance of any multipath redundancy systems. The potential value lies in the architecture's ability to do so in a way that places the intelligence in the network, rather than relying on mechanisms that are better suited for end systems. The proposed approach is able to minimize the failure response times [subject to pre-configured user requirements] and, further, is indifferent to changing network conditions. Previously considered schemes that can be implemented in routing elements use fixed parameterization and, therefore, cannot optimize the failure response time. It is also worth noting that placing this intelligence in the network is a technically sound decision. Performing the switchover in the host requires explicit support from the application. By performing the switchover in the network, the mechanism provides a redundancy service that is transparent to the end user and that supports legacy applications.

Returning now to an operational flow, the theory is to switch from the active stream to the standby stream if no packet has been received on the active stream for some configurable period of time. Accordingly, before performing a switchover, the mechanism must wait for a period of inactivity on the active stream that is greater than the Estimated Maximum Inter-Arrival Time (EMIT) of the standby stream. The EMIT should be estimated in such a way that it is short enough to guarantee a quick response to failures, yet long enough to exceed the majority of observations and avoid spurious switchovers.

In order to strike a balance between response time and susceptibility to unwarranted switchovers, example embodiments of the mechanism use an adaptive computation of the EMIT. This is driven by a conforming metric, which is configurable and which ensures the behavior of the mechanism conforms to the users expectations. In more specific terms, there is a conforming metric epsilon, where the user's expectation is that 100 (epsilon) percent of the inter-arrival time observations should be less than EMIT. The mechanism can adapt to the user's expectation regardless of the timing properties of the stream and changing network conditions.

Figure 3:
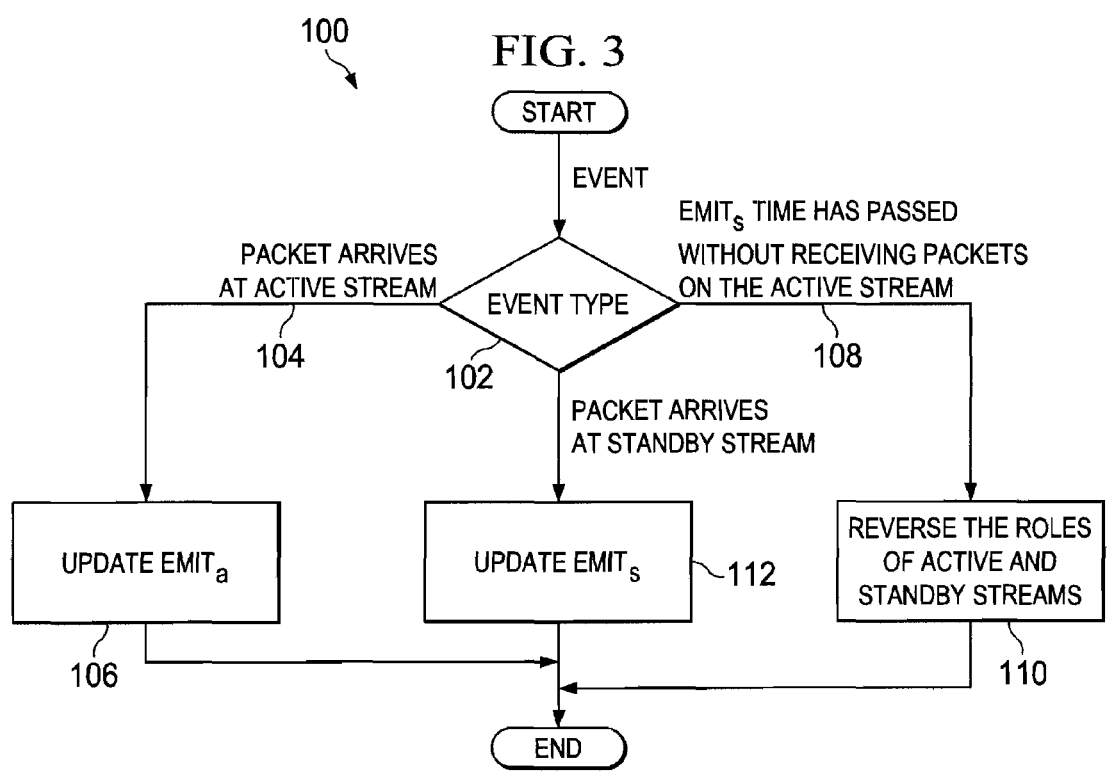
FIG. 3 is a simplified flowchart illustrating a series of example steps associated with the communication system.

Turning to FIG. 3, FIG. 3 is a simplified flowchart illustrating some example steps associated with a flow 100. The method can begin where the architecture is monitoring the inter-arrival time of packets. The arrival time is the arrival between two consecutive packets. To compute the EMIT, the inter-arrival time of the standby stream is constantly observed after every packet arrival. The average and the standard deviation can also be updated on every observation. These metrics can be computed for a moving time window or using a simpler exponential approach. We can let the AIT be the average inter-time and SID be the standard inter-arrival deviation.

In one example, the EMIT can be defined as:

$EMIT=AIT+(alpha \times SID)$

Alpha can be a coefficient that adapts to conform to expectations regardless of the timing properties of the stream and changing network conditions. Recall that in many statistical theories, in a normal distribution, 95% of the samples should fall below two times the standard deviation. To express this notion in different terms, the average plus two times the standard deviation should cover 95% of the observations. In practice, one often assumes that the data are from an approximately normal distributed population. This is ideally justified by the classical central limit theorem, which says that sums of many independent, identically distributed random variables tend towards the normal distribution as a limit. If that assumption is justified, then about 68% of the values are within one standard deviation of the mean, about 95% of the values are within two standard deviations, and about 99% lie within three standard deviations. This is known as the 68-95-99 rule (i.e., the empirical rule).

For the architecture of the present invention, it is not necessarily certain that the distribution is a normal distribution, and to account for this, a variable is added (alpha) to calculate the EMIT. The alpha value can be changed and modified in order to achieve the desired value (e.g., 98%). The user can specify the percentage (e.g., 90%, 92%, 95%, 99%, etc.), as the present invention is configurable. Given the percentage, the alpha value can be determined.

To compute alpha, the algorithm keeps a binary history over a moving time window. Each binary value in the history represents whether a particular inter-arrival observation was below the EMIT. The history is used to compute the percentage of conforming observations. Note that at any given time, there is a current (or previous) EMIT value. A history is kept of observations that are below the EMIT. If the user has configured the EMIT to be 98%, the new arrival time is compared to the alpha. If the percentage of conforming observations is less than (100-epsilon) percent, the value of alpha is increased. If the percentage is more, the value of alpha is decreased. The amount by which alpha changes may be fixed or it may change as we get closer or move away from the threshold. In essence, alpha is fluctuating modestly up and down as new inter-arrival times are received. These fluctuations can continue to change (or affect) other parameters, such as the history, the EMIT, the standard deviation, etc.

Returning back to the steps of FIG. 3, which are illustrative of these concepts, at step 102, there is an event type (e.g., a link failure). At step 104, a packet arrives at the active stream link and the $EMIT_a$ is updated at step 106. The system can switch streams if, on the active link, a packet has not been received for some configurable time (e.g., the configurable time covers 98% of the arrivals on the standby link in this example). Thus, on the standby, there is constant monitoring and an average arrival time is maintained. For example, packets could be arriving every 50 milliseconds. There can be a standard deviation included in this average (e.g., +/−20 milliseconds from the average). The average and the standard deviation can be used to formulate an estimate, which is most likely greater than the average and which covers some percentage (e.g., 98%) of the arrivals on the standby link. The $EMIT_S$ metric is indicating that 98% of the inter-arrivals on the standby link are less than that number. The system will switch from the active stream to the standby stream if a packet has not been received on the active for the EMIT time period.

Thus, at step 108, the $EMIT_S$ time has passed without receiving packets on the active stream. This causes the system to reverse the roles of the active and standby streams at step 110, meaning that the standby is now the active and the active is now the standby, where the algorithm reverses itself. The $EMIT_S$ is also updated at step 112. From the perspective of the software or the algorithm that may be running such a process, this element is identifying when there has been no reception (on the active link) of packets for the EMIT period. Thus, this element is monitoring the standby and determining the EMIT and subsequently comparing that to what is occurring on the active link. Where packets are not being received during this time period, an assumption is made that something is wrong and the system should switch to the standby link.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in FIG. 3 illustrate only some of the possible scenarios that may be executed by, or within, communication system 10. Some of these steps may be deleted or removed where appropriate, or these steps may be modified or changed considerably without departing from the scope of the present invention. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present invention.

Although the present invention has been described in detail with reference to particular arrangements and configurations, these example configurations and arrangements may be changed significantly without departing from the scope of the present invention. For example, although the present invention has been described with reference to particular communication exchanges involving routing protocols, communication system 10 may be applicable to other exchanges, routing protocols, or routed protocols in which packets (not necessarily the routing protocol described) are exchanged in order to provide optimal routing and redundancy in a network environment.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. A method, comprising:
receiving a first plurality of packets from an active stream at an output device and communicating the first plurality of packets to a next destination;
receiving a second plurality of packets from a standby stream of the output device, wherein the streams are sent by an input device; and
performing a switchover at the output device such that the second plurality of packets are communicated to the next destination and the first plurality of packets are not, wherein the switchover is triggered when a portion of the first plurality of the packets from the active stream is not received during a period of time that is greater than a majority of inter-arrival times of the second plurality of packets on the standby stream, wherein the switchover is performed after waiting for a period of inactivity on the active stream that is greater than an estimated maximum inter-arrival time (EMIT) of the second plurality of the packets of the standby stream, wherein the EMIT is computed by observing an average inter time (AIT) and adding that to a standard inter-arrival deviation (SID), which is multiplied by a constant.

2. The method of claim 1, wherein the switchover occurs as a result of an event on the active stream, the event being a selected one of group of events, the group consisting of a link failure, a disruption in the first plurality of packets, an irregularity in the first plurality of packets, and an error on the active stream.

3. The method of claim 1, wherein the packets are related to video or audio broadcast services.

4. The method of claim 1, wherein the packets are related to a real-time transport protocol (RTP).

5. The method of claim 1, wherein the packets are multicast packets.

6. The method of claim 1, wherein the constant is determined by maintaining a history over a moving time window, wherein the history represents whether a particular inter-arrival observation is below the EMIT, the history being used to compute a percentage of conforming observations.

7. The method of claim 1, wherein a new arrival time is compared to the constant and if a percentage of conforming observations is less than a configurable percentage, then the constant is increased and if the percentage of conforming observations is more than the configurable percentage, then the constant is decreased.

8. An apparatus, comprising:
an output device receiving a first plurality of packets from an active stream, communicating the first plurality of packets to a next destination, and receiving a second plurality of packets from a standby stream of the output device, wherein the streams are sent by an input device, the output device performing a switchover at the output device such that the second plurality of packets are communicated to the next destination and the first plurality of packets are not, wherein the switchover is triggered when a portion of the first plurality of the packets from the active stream is not received during a period of time that is greater than a majority of inter-arrival times of the second plurality of packets on the standby stream, wherein the switchover is performed after waiting for a period of inactivity on the active stream that is greater than an estimated maximum inter-arrival time (EMIT) of the second plurality of the packets of the standby stream, wherein the EMIT is computed by observing an average inter time (AIT) and adding that to a standard inter-arrival deviation (SID), which is multiplied by a constant.

9. The apparatus of claim 8, wherein the constant is determined by maintaining a history over a moving time window, wherein the history represents whether a particular inter-arrival observation is below the EMIT, the history being used to compute a percentage of conforming observations.

10. Logic encoded in one or more tangible non-transitory media for execution and when executed by a processor operable to:
receive a first plurality of packets from an active stream at an output device and communicating the first plurality of packets to a next destination;
receive a second plurality of packets from a standby stream of the output device, wherein the streams are sent by an input device; and
perform a switchover at the output device such that the second plurality of packets are communicated to the next destination and the first plurality of packets are not, wherein the switchover is triggered when a portion of the first plurality of the packets from the active stream is not received during a period of time that is greater than a majority of inter-arrival times of the second plurality of packets on the standby stream, wherein the switchover is performed after waiting for a period of inactivity on the active stream that is greater than an estimated maximum inter-arrival time (EMIT) of the second plurality of the packets of the standby stream, wherein the EMIT is computed by observing an average inter time (AIT) and adding that to a standard inter-arrival deviation (SID), which is multiplied by a constant.

11. The logic of claim 10, wherein the packets are related to a real-time transport protocol (RTP).

12. The logic of claim 10, wherein the switchover occurs as a result of an event on the active stream, the event being a selected one of group of events, the group consisting of a link failure, a disruption in the first plurality of packets, an irregularity in the first plurality of packets, and an error on the active stream.

13. The logic of claim 10, wherein the packets are related to video or audio broadcast services.

14. A system, comprising:
   means for receiving a first plurality of packets from an active stream and communicating the first plurality of packets to a next destination;
   means for receiving a second plurality of packets from a standby stream of an output device, wherein the streams are sent by an input device; and
   means for performing a switchover at the output device such that the second plurality of packets are communicated to the next destination and the first plurality of packets are not, wherein the switchover is triggered when a portion of the first plurality of the packets from the active stream is not received during a period of time that is greater than a majority of inter-arrival times of the second plurality of packets on the standby stream, wherein the switchover is performed after waiting for a period of inactivity on the active stream that is greater than an estimated maximum inter-arrival time (EMIT) of the second plurality of the packets of the standby stream, wherein the EMIT is computed by observing an average inter time (AIT) and adding that to a standard inter-arrival deviation (SID), which is multiplied by a constant.

15. The system of claim 14, wherein the packets are related to video or audio broadcast services, and wherein the packets are related to a real-time transport protocol (RTP).

16. The system of claim 14, wherein the EMIT is computed by observing inter-arrival times of the second plurality of packets on the standby stream.

17. The system of claim 14, wherein the switchover occurs as a result of an event on the active stream, the event being a selected one of group of events, the group consisting of a link failure, a disruption in the first plurality of packets, an irregularity in the first plurality of packets, and an error on the active stream.

* * * * *